United States Patent [19]

Marshall et al.

[11] Patent Number: 4,936,766
[45] Date of Patent: Jun. 26, 1990

[54] APPARATUS FOR AGGLOMERATING POWDERS

[75] Inventors: Alan Marshall, West View; Warren Baxter, Whitehaven, both of United Kingdom

[73] Assignee: British Nuclear Fuels plc, Warrington, England

[21] Appl. No.: 312,484

[22] Filed: Feb. 21, 1989

[30] Foreign Application Priority Data

Mar. 4, 1988 [GB] United Kingdom ............... 8805150

[51] Int. Cl.⁵ ............................... B01J 2/10
[52] U.S. Cl. ............................ 425/222; 366/279
[58] Field of Search ................. 425/222; 366/279

[56] References Cited

U.S. PATENT DOCUMENTS

| 249,678 | 11/1881 | Robinson | 366/279 |
| 626,869 | 6/1899 | Sands | 366/279 |
| 3,168,292 | 2/1965 | Joschko | 366/279 |
| 3,454,263 | 7/1969 | Galle . | |
| 3,531,092 | 9/1970 | Praschak et al. | 366/279 |
| 4,353,852 | 10/1982 | Tse | 425/222 |
| 4,545,216 | 10/1985 | Cavalli | 366/279 |
| 4,556,325 | 12/1985 | Katzin | 366/279 |

FOREIGN PATENT DOCUMENTS

| 1183901 | 2/1959 | France | 366/279 |
| 3333733 | 3/1984 | France . | |
| 60-248224 | 12/1985 | Japan | 425/222 |
| 63-23730 | 2/1988 | Japan | 425/222 |
| 632939 | 11/1982 | Switzerland . | |
| 1000092 | 2/1983 | U.S.S.R. | 425/222 |
| 1171083 | 8/1985 | U.S.S.R. | 425/222 |

Primary Examiner—Tim Miles
Attorney, Agent, or Firm—William R. Hinds

[57] ABSTRACT

A powder spheroidiser has a housing in which is rotatable a paddle blade having two concave surfaces 8, 9 defining chambers 40, 41 with a surrounding surface 33. Powder admitted through closable inlet 51 is agglomerated into granules by rotating the paddle, the powder rolling over curved surfaces 8, 9, 33. The granules may be removed through closable outlet 52.

6 Claims, 2 Drawing Sheets

APPARATUS FOR AGGLOMERATING POWDERS

This invention relates to apparatus for agglomerating powders.

According to this invention apparatus for agglomerating powders is characterised by a paddle rotatable in a housing about a generally horizontal axis, the housing having end walls and a peripheral wall, the paddle defining a chamber with the end walls and an inner surface of the peripheral wall, the paddle having a surface which confronts the chamber, the paddle surface which confronts the chamber being concave, the paddle having an arcuate outer surface close to the inner surface of the peripheral wall, and means for admitting powder to the chamber.

The concave surface may have the same radius as the inner surface of the peripheral wall.

The paddle may be shaped to provide two such chambers, angularly spaced. The two chambers may be diametrically opposed. The paddle may be generally bow-tie shaped.

There may be a closable inlet and a closable outlet in the peripheral wall.

The invention may be performed in various ways and one specific embodiment with possible modifications will now be described by way of example with reference to the accompanying diagrammatic drawings, in which.

In the present case powder is agglomerated into granules.

Figure 1:
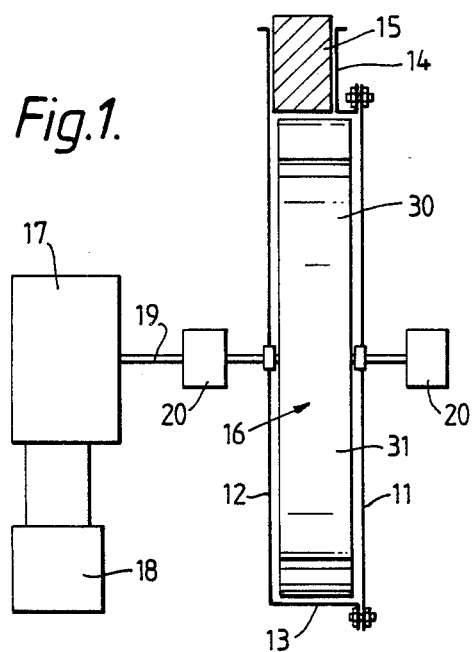
FIG. 1 is a side view of a spheroidiser.
Figure 2:
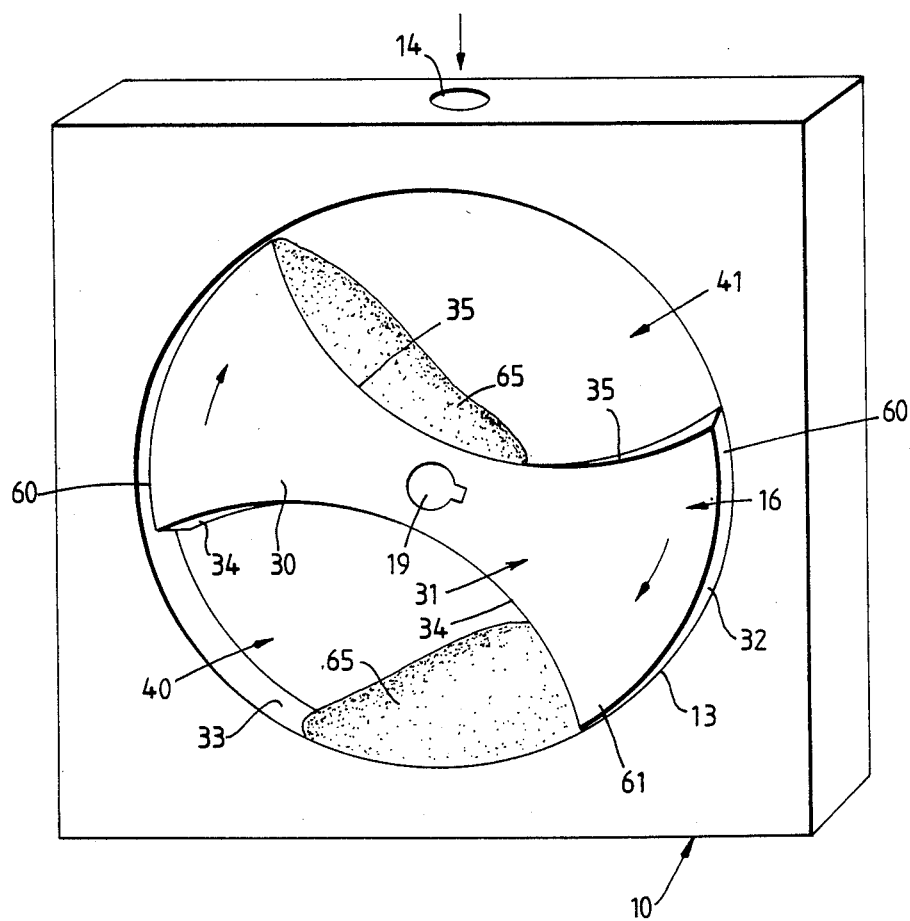
FIG. 2 is a perspective view of part of FIG. 1.

Referring to FIGS. 1 and 2, a spheroidising device has a housing 10 having front and rear walls 11, 12 and a peripheral wall 13 having an inlet/outlet port 14 closable by a removable plug 15.

A paddle 16 in the housing 10 is rotatable by an electric motor 17 having a control unit 18 and a driving shaft 19 supported in bearings 20 and sealingly extending through walls 11, 12. The paddle 16 may for example be rotatable at a selected speed within the range 4 to 100 rpm.

The front wall 11 can be transparent e.g. glass or perspex.

The paddle 16 has blade means in the form of blades 30, 31 on opposite sides of the shaft 19. Each blade 30, 31 has an outer arcuate surface 32 close to the inner surface 33 of the wall 13 to resist build-up of material.

The sides 34, 35 of the blades merge to give two smooth part-circular curved surfaces 8, 9 (FIG. 3) of a radius equal to the radius of the surface 33 (e.g. 100 mm).

Powder 65 is fed through the port 14 into one or both of the chambers 40, 41 respectively provided by the concave sides 34, 35 (8, 9) and the surface 33, the plug 15 closes the port 14, the paddle 16 is rotated at a speed and for a time found appropriate for the particular powder e.g. 20 rpm for 15 minutes for ceria powder. Higher speeds may cause the powder to be thrown rather than rolled. The extent of agglomeration can be assessed in tests using for example angle of slip and standard flowrate tests. When the powder has been spheroidised, the plug 15 is removed and the device inverted to discharge the granules through the port 14. The granules may not be spheres and the term spheroidiser is not restricted to spherical granules.

The device may be located in a glove box and may discharge into a container.

A preferred loading may be obtained by tests. Thus a 35% by volume loading of chamber 40 and/or chamber 41 is preferred for ceria powder $CeO_2$.

Figure 3:
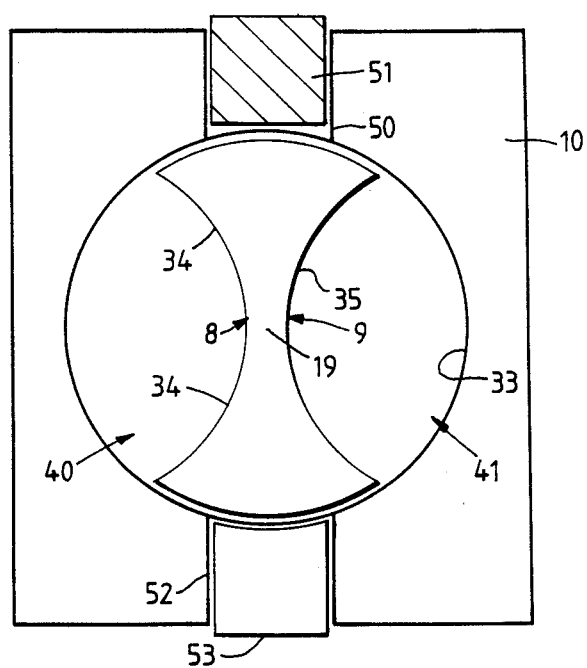
FIG. 3 is an end view of another arrangement.

In a preferred arrangement of FIG. 3, the housing has a top inlet port 50 and associated plug 51, and a bottom discharge outlet 52 and associated plug 53 so there is no need to invert the housing.

The housing 10 is normally stationary.

The body 10 is fixed, allowing permanent connections during filling and emptying. The inlet and outlet ports 50, 51 are simply plugged but the plugs can be replaced by valves. Motion is imparted to the powder inside the spheroidiser by the action of the rotor or paddle; the curved surfaces 34, 35 of which are of the same radius as the internal surface 33 of the spheroidiser housing. Thus, by the action of the rotor, powder is continually rolled on surfaces of this radius.

$UO_2$ and $PuO_2$ - $UO_2$ powders can be granulated.

In a modification the trailing ends 60 (FIG. 2) of the outer arcuate surfaces of the paddle 16 are further from the inner surface 33 of the wall than the leading ends 61 to resist build-up of material as a result of compression of the material against the surface 33.

The concave surfaces 8, 9 need not have the same radius as the surface 33.

Preferably surfaces 8, 9, 33 are polished to a mirror finish.

The device converts the fine powder into a free-flowing granular material.

The plugs could be replaced by valves.

We claim:

1. Apparatus for agglomerating powders characterised by a paddle rotatable in a housing about a generally horizontal axis, the housing having end walls and a peripheral wall, the paddle defining a chamber with the end walls and an inner surface of the peripheral wall, the paddle having a surface which confronts the chamber, the paddle surface which confronts the chamber being concave, the paddle having an arcuate outer surface close to the inner surface of the peripheral wall, and means for admitting powder to the chamber.

2. Apparatus as claimed in claim 1, characterised in that the inner surface has a radius and the concave surface has a radius equal to the radius of the inner surface.

3. Apparatus as claimed in claim 1, characterised in that a trailing end of the arcuate surface is further from the inner surface than a leading end.

4. Apparatus as claimed in claim 1, characterised by a closable inlet and a closable outlet in the peripheral wall.

5. Apparatus as claimed in claim 1 characterised in that the paddle is shaped to provide two said chambers, angularly spaced.

6. Apparatus as claimed in claim 5, characterised in that the paddle is generally bow-tie shaped and the two chambers are diametrically opposed.

* * * * *